United States Patent
Gilton et al.

(10) Patent No.: US 11,711,206 B2
(45) Date of Patent: Jul. 25, 2023

(54) COMMUNICATING SECURELY WITH DEVICES IN A DISTRIBUTED CONTROL SYSTEM

(71) Applicant: General Electric Company, Schenectady, NY (US)

(72) Inventors: Jeffrey S. Gilton, Cincinnati, OH (US); Douglas R. Nichols, Kentwood, MI (US); Mark E. Hingsbergen, Fairfield Township, OH (US); Matthew B. Pfenninger, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 192 days.

(21) Appl. No.: 17/030,682

(22) Filed: Sep. 24, 2020

(65) Prior Publication Data
US 2021/0099292 A1   Apr. 1, 2021

Related U.S. Application Data

(60) Provisional application No. 62/906,355, filed on Sep. 26, 2019.

(51) Int. Cl.
*H04L 9/08*   (2006.01)
*H04L 9/32*   (2006.01)

(52) U.S. Cl.
CPC .......... *H04L 9/0825* (2013.01); *H04L 9/0822* (2013.01); *H04L 9/0841* (2013.01); *H04L 9/3247* (2013.01)

(58) Field of Classification Search
CPC ... H04L 9/0825; H04L 9/0822; H04L 9/0841; H04L 9/3247

(Continued)

(56) References Cited

U.S. PATENT DOCUMENTS

| 7,552,321 B2 | 6/2009 | Rockwood et al. |
| 8,479,260 B2 | 7/2013 | Price |

(Continued)

FOREIGN PATENT DOCUMENTS

| CN | 106603485 A | 4/2017 |
| CN | 106656481 A | 5/2017 |

(Continued)

OTHER PUBLICATIONS

Extended European Search Report for EP Application No. 20195683.6 dated May 14, 2021 (10 pages).

(Continued)

*Primary Examiner* — Amie C. Lin
*Assistant Examiner* — Moeen Khan
(74) *Attorney, Agent, or Firm* — Dinsmore & Shohl LLP

(57) ABSTRACT

A method comprises a server generating a server nonce and transmitting a server public key, a key signature and the server nonce to a device, the device verifying the server public key, signing the server nonce with a device private key, generating a device nonce, and transmitting the server nonce, the server nonce signature, a device public key, a device key signature, and the device nonce to the server, the server verifying the server nonce and the device public key, generating a session key, encrypting the session key with the device public key, signing the device nonce and the session key with a server private key, and transmitting the device nonce, the signed device nonce and session key, and the encrypted session key to the device, and the device verifying the device nonce, decrypting the encrypted session key with the device private key, and verifying the decrypted session key.

9 Claims, 5 Drawing Sheets

(58) Field of Classification Search
USPC .......................................................... 713/171
See application file for complete search history.

(56) References Cited

U.S. PATENT DOCUMENTS

| | | | |
|---|---|---|---|
| 8,825,227 | B2 | 9/2014 | Saint-Marc et al. |
| 9,576,404 | B2 | 2/2017 | Ziarno et al. |
| 10,547,613 | B1* | 1/2020 | Roths .................... H04L 9/0844 |
| 2003/0217165 | A1 | 11/2003 | Buch et al. |
| 2005/0033957 | A1* | 2/2005 | Enokida ............. H04L 63/0823 |
| | | | 726/4 |
| 2008/0294894 | A1 | 11/2008 | Dubhashi et al. |
| 2009/0217043 | A1* | 8/2009 | Metke ................. H04W 12/069 |
| | | | 713/171 |
| 2012/0271380 | A1* | 10/2012 | Roberts ................ H04L 63/068 |
| | | | 607/60 |
| 2013/0036308 | A1 | 2/2013 | Buch et al. |
| 2013/0305391 | A1 | 11/2013 | Haukom et al. |
| 2016/0373418 | A1* | 12/2016 | Ståhl ....................... H04L 63/08 |
| 2017/0346819 | A1 | 11/2017 | Roth et al. |
| 2019/0236560 | A1* | 8/2019 | Song ...................... G06Q 20/06 |
| 2020/0198797 | A1 | 6/2020 | Skertic et al. |
| 2020/0204400 | A1 | 6/2020 | Skertic et al. |
| 2020/0285207 | A1 | 9/2020 | Lu et al. |
| 2020/0374136 | A1* | 11/2020 | Momchilov .......... H04L 9/0819 |

FOREIGN PATENT DOCUMENTS

| | | |
|---|---|---|
| CN | 108512846 A | 9/2018 |
| CN | 110138548 A | 8/2019 |
| EP | 1800409 B1 | 6/2007 |
| EP | 2139172 B1 | 12/2009 |
| WO | 2017188895 A1 | 11/2017 |

OTHER PUBLICATIONS

Partial European Search Report for EP Application No. 20195683.6 dated Feb. 12, 2021 (11 pages).

Notice of Allowance for Chinese Patent Application No. 202011024616.4 dated Sep. 21, 2022 (7 pages with English translation).

* cited by examiner

COMMUNICATING SECURELY WITH DEVICES IN A DISTRIBUTED CONTROL SYSTEM

CROSS-REFERENCE TO RELATED APPLICATION

This application claims priority to U.S. Provisional Application No. 62/906,355, filed Sep. 26, 2019, the entire contents of which is hereby incorporated by reference.

FIELD

The present disclosure relates to devices, systems, and methods for communicating between devices in an aircraft system, and more specifically, for devices, systems, and methods for communicating securely with devices in a distributed control system.

BACKGROUND

Aircraft and other systems often include distributed control systems with embedded devices. Secure communication between the embedded components is important for security and other reasons. Accordingly, a need exists for systems and methods of quickly establishing secure communication protocols between embedded products in a distributed control system.

SUMMARY

In an embodiment, a method of establishing secure communication between a server and a device in a distributed control system, wherein a first public-private key pair including a server public key and a server private key is associated with the server, and wherein a second public-private key pair including a device public key and a device private key is associated with the device includes, with the server, generating a server nonce. The method further includes transmitting the server public key, a server key signature, and the server nonce from the server to the device. The method further includes, with the device, verifying the server public key, signing the server nonce with the device private key, resulting in a server nonce signature, and generating a device nonce. The method further includes transmitting the server nonce, the server nonce signature, the device public key, a device key signature, and the device nonce from the device to the server. The method further includes, with the server, verifying the server nonce, verifying the device public key, generating a session key, encrypting the session key with the device public key, resulting in an encrypted session key, and signing a combination of the device nonce and the session key with the server private key, resulting in a combined signature. The method further includes transmitting the device nonce, the combined signature, and the encrypted session key from the server to the device. The method further includes, with the device, verifying the device nonce, decrypting the encrypted session key with the device private key, resulting in a decrypted session key, and verifying the decrypted session key.

In an embodiment, a distributed control system includes an electronic control unit and one or more distributed control modules. A server public-private key pair including a server public key and a server private key is associated with the electronic control unit. One or more device public-private key pairs, each including a device public key and a device private key, are associated with the one or more distributed control modules. An authorization public-private key pair including an authorization public key and an authorization private key is associated with the distributed control system. A server key signature includes the server public key signed with the authorization private key. A device key signature includes the device public key signed with the authorization private key. The electronic control unit and at least one distributed control module perform a first method to establish a first session key for engaging in semi-secure encrypted communications with each other. The electronic control unit and the at least one distributed control module further perform a second method to establish a second session key for engaging in secure encrypted communications with each other.

In an embodiment, an electronic engine control including a key database storing a public-private key pair comprising a server public key and a corresponding server private key. The electronic engine control further includes a transceiver sending messages to one or more devices and receiving messages from one or more devices. The electronic engine control further includes a server nonce generator generating a server nonce. The electronic engine control further includes a key signing module signing messages with the server private key. The electronic engine control further includes an encryption module encrypting messages with a device public key and encrypting messages with a session key. The electronic engine control further includes a decryption module using the server private key to decrypt messages encrypted using the server public key and using the session key to decrypt messages encrypted with the session key. The electronic engine control further includes a verification module using a received public key to decrypt messages signed with a private key corresponding to the received public key. The electronic engine control further includes a session key generator generating the session key.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

The present disclosure generally relates to devices, systems, and methods for establishing secure communication protocols between embedded devices in a distributed control system, such as an aircraft system with distributed architecture. The devices, systems, and methods described herein ensure that communication is only between devices within the distributed control system. This ensures integrity and confidentially of the data transmitted between devices. When combined with a secure boot, this ensures that the distributed control system has not been tampered with, thereby ensuring a secure system.

Figure 1:
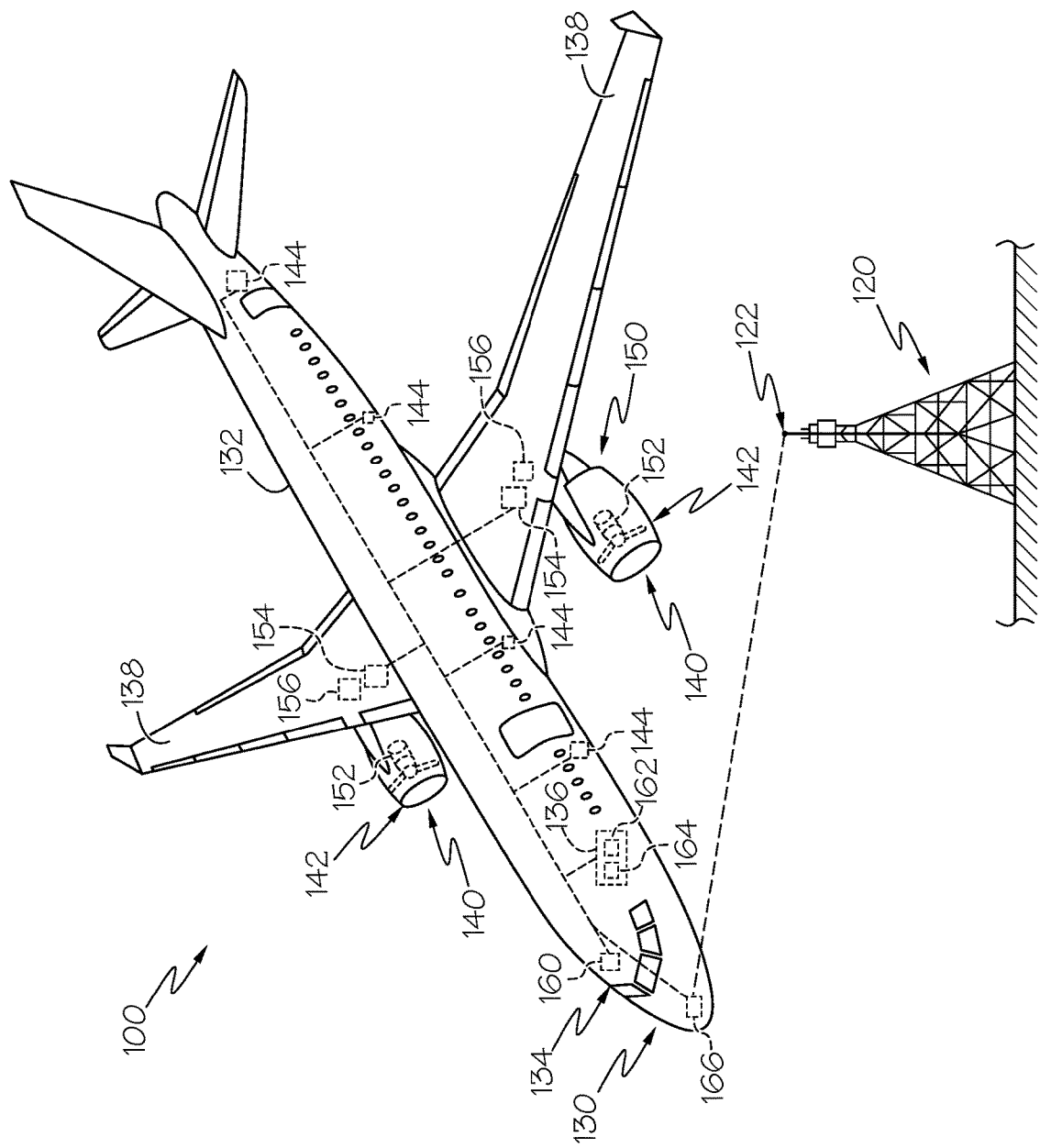
FIG. 1 schematically depicts an illustrative distributed control system according to one or more embodiments shown and described herein.

FIG. 1 depicts an illustrative distributed control system 100, which is used to control various components of an aircraft 130 according to various embodiments. The aircraft 130 generally includes a fuselage 132, wing assemblies 138, and one or more engines 140. While FIG. 1 depicts the aircraft 130 as being a fixed-wing craft having two wing assemblies 138 with one engine 140 mounted on each wing assembly 138 (two engines 140 total), other configurations are contemplated. For example, other configurations may include more than two wing assemblies 138, more than two engines 140 (e.g., trijets, quadjets, etc.), engines 140 that are not mounted to a wing assembly 138 (e.g., mounted to the fuselage, mounted to the tail, mounted to the nose, etc.), non-fixed wings (e.g., rotary wing aircraft), and/or the like.

As illustrated in FIG. 1, the aircraft 130 may include the engines 140 coupled to the wing assemblies 138 and/or the fuselage 132, a cockpit 134 positioned in the fuselage 132, and the wing assemblies 138 extending outward from the fuselage 132. A control mechanism 160 for controlling the aircraft 130 is included in the cockpit 134 and may be operated by a pilot located therein. It should be understood that the term "control mechanism" as used herein is a general term used to encompass all aircraft control components, particularly those typically found in the cockpit 134.

A plurality of additional aircraft systems 144 that enable proper operation of the aircraft 130 may also be included in the aircraft 130 as well as an engine controller 136, and a communication system having the aircraft wireless communications link 166. The additional aircraft systems 144 may generally be any systems that effect control of one or more components of the aircraft 130, such as, for example, cabin pressure controls, elevator controls, rudder controls, flap controls, spoiler controls, landing gear controls, heat exchanger controls, and/or the like. In some embodiments, the avionics of the aircraft 130 may be encompassed by one or more of the additional aircraft systems 144. The aircraft wireless communications link 166 may generally be any air-to-ground communication system now known or later developed. Illustrative examples of the aircraft wireless communications link 166 include, but are not limited to, a transponder, a very high frequency (VHF) communication system, an aircraft communications addressing and reporting system (ACARS), a controller-pilot data link communications (CPDLC) system, a future air navigation system (FANS), and/or the like. The engine controller 136 may be operably coupled to the plurality of aircraft systems 144 and the engines 140. While the embodiment depicted in FIG. 1 specifically refers to the engine controller 136, it should be understood that other controllers may also be included within the aircraft 130 to control various other aircraft systems 144 that do not specifically relate to the engines 140.

In some embodiments, the engine controller 136 is mounted on the one or more engines 140. However, the engine controller 136 may be mounted to or integrated with other aircraft components in other embodiments. For example, the engine controller may be mounted within the aircraft (e.g., not on the one or more engines 140) in some embodiments. The engine controller 136 may also be connected with other controllers of the aircraft 130. In embodiments, the engine controller 136 may include a processor 162 and/or memory 164, including non-transitory memory. In some embodiments, the memory 164 may include random access memory (RAM), read-only memory (ROM), flash memory, or one or more different types of portable electronic memory, such as discs, DVDs, CD-ROMs, or the like, or any suitable combination of these types of memory. The processor 162 may carry out one or more programming instructions stored on the memory 164, thereby causing operation of the engine controller 136. That is, the processor 162 and the memory 164 within the engine controller 136 may be operable to carry out the various processes described herein with respect to the engine controller 136, including operating various components of the aircraft 130 (such as the engine 140 and/or components thereof), monitoring the health of various components of the aircraft 130 (e.g., the engine 140 and/or components thereof), monitoring operation of the aircraft 130 and/or components thereof.

Figure 2:
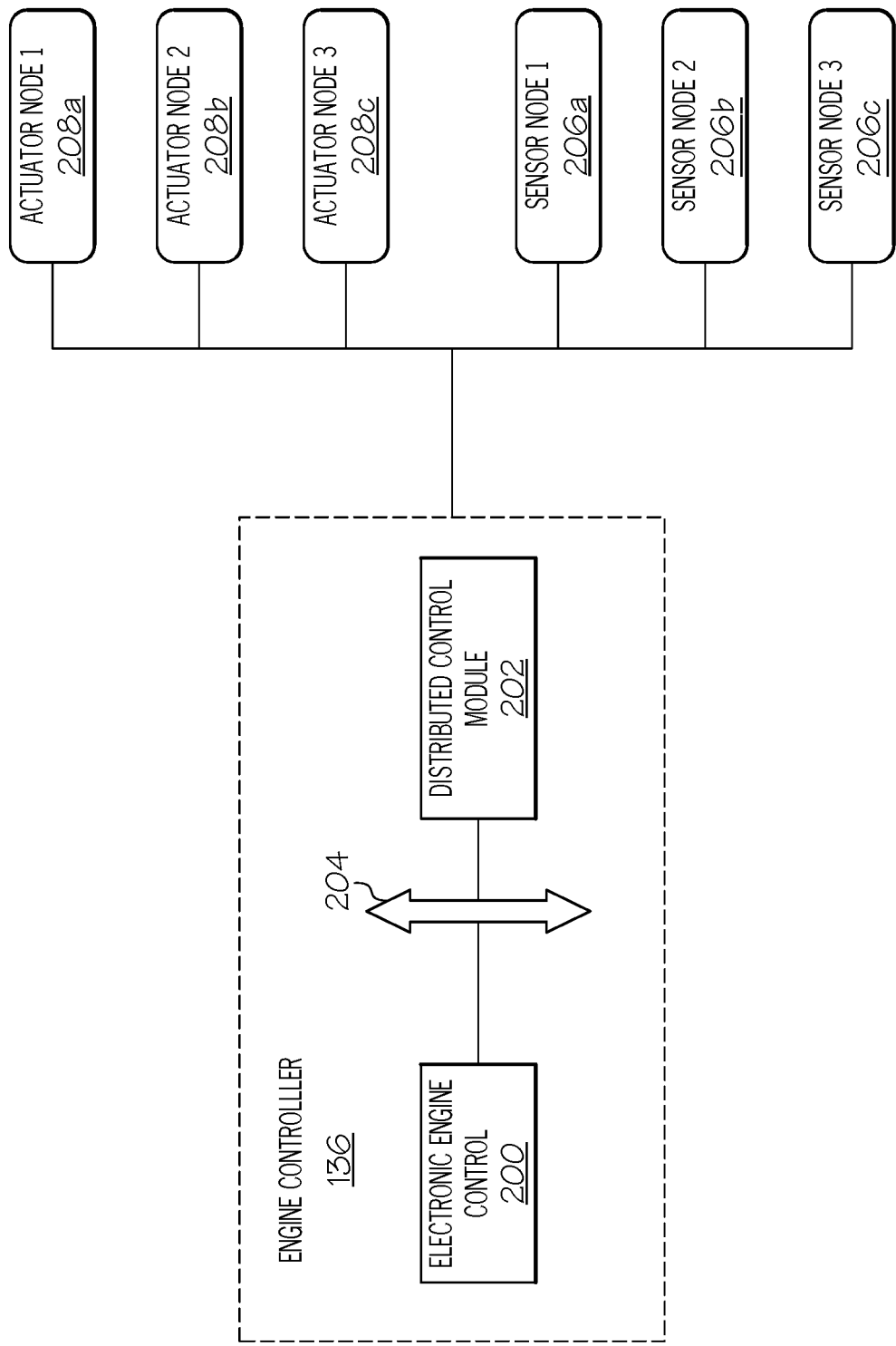
FIG. 2 schematically depicts a portion of the distributed control system of FIG. 1.

In some embodiments, the engine controller 136 may be a full authority digital engine control (FADEC) system. The FADEC system includes an electronic engine controller (EEC) 200 or engine control unit (ECU) or electronic control unit and a distributed control module (DCM) 202, as shown in FIG. 2, and described in further detail below. Returning to FIG. 1, the FADEC system may also contain one or more additional components that are configured to control various aspects of performance of the engines 140. The FADEC system generally has full authority over operating parameters of the engines 140 and cannot be manually overridden. A FADEC system generally functions by receiving a plurality of input variables of a current flight condition, including, but not limited to, air density, throttle lever position, engine temperature, engine pressure, and/or the like. The inputs are received, analyzed, and used to determine operating parameters such as, but not limited to, fuel flow, stator vane position, bleed valve position, and/or the like. The FADEC system may also control a start or a restart of the engines 140. The operating parameters of the FADEC can be modified by installing and/or updating software. As such, the FADEC can be programmatically controlled to determine engine limitations, receive engine health reports, receive engine maintenance reports and/or the like to undertake certain measures and/or actions in certain conditions.

In some embodiments, the engine controller 136 may include one or more programming instructions for diagnosing and/or predicting one or more engine system faults in the aircraft 130. Diagnosed and/or predicted faults may include, but are not limited to, improper operation of components, failure of components, indicators of future failure of components, and/or the like. As used herein, the term diagnosing refers to a determination after the fault has occurred and contrasts with prediction, which refers to a forward looking determination that makes the fault known in advance of when the fault occurs. Along with diagnosing, the engine controller 136 may detect the fault.

The program run by the engine controller 136 (e.g., executed by the processor 162 and stored within the memory 164) may include a computer program product that includes machine-readable media for carrying or having machine-executable instructions or data structures. Such machine-readable media may be any available media, which can be accessed by a general purpose or special purpose computer or other machine with a processor. Generally, such a computer program may include routines, programs, objects, components, data structures, algorithms, and/or the like that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions. In some embodiments, the computer program product may be provided by a component external to the engine controller 136 and installed for use by the engine controller 136.

In embodiments, each of the engines 140 may include a fan 142 and one or more sensors 150 for sensing various characteristics of the fan 142 during operation of the engines 140. Illustrative examples of the one or more sensors 150 include, but are not limited to, a fan speed sensor 152, a temperature sensor 154, and a pressure sensor 156. The fan speed sensor 152 is generally a sensor that measures a rotational speed of the fan 142 within the engine 140. The temperature sensor 154 may be a sensor that measures a fluid temperature within the engine 140 (e.g., an engine air temperature), a temperature of fluid (e.g., air) at an engine intake location, a temperature of fluid (e.g., air) within a compressor, a temperature of fluid (e.g., air) within a turbine, a temperature of fluid (e.g., air) within a combustion chamber, a temperature of fluid (e.g., air) at an engine exhaust location, a temperature of cooling fluids and/or heating fluids used in heat exchangers in or around an engine, and/or the like. The pressure sensor 156 may be a sensor that measures a fluid pressure (e.g., air pressure) in various locations in and/or around the engine 140, such as, for example, a fluid pressure (e.g., air pressure) at an engine intake, a fluid pressure (e.g., air pressure) within a compressor, a fluid pressure (e.g., air pressure) within a turbine, a fluid pressure (e.g., air pressure) within a combustion chamber, a fluid pressure (e.g., air pressure) at an engine exhaust location, and/or the like.

In some embodiments, each of the engines 140 may have a plurality of sensors 150 associated therewith (including one or more fan speed sensors 152, one or more temperature sensors 154, and/or one or more pressure sensors 156). That is, more than one of the same type of sensor 150 may be used to sense characteristics of an engine 140 (e.g., a sensor 150 for each of the different areas of the same engine 140). In some embodiments, one or more of the sensors 150 may be utilized to sense characteristics of more than one of the engines 140 (e.g., a single sensor 150 may be used to sense characteristics of two engines 140). The engines 140 may further include additional components not specifically described herein, and may include one or more additional sensors 150 incorporated with or configured to sense such additional components in some embodiments.

In embodiments, each of the sensors 150 (including, but not limited to, the fan speed sensors 152, the temperature sensors 154, and the pressure sensors 156) may be communicatively coupled to one or more components of the aircraft 130 such that signals and/or data pertaining to one or more sensed characteristics are transmitted from the sensors 150 for the purposes of determining, detecting, and/or predicting a fault, as well as completing one or more other actions in accordance with software programming that requires sensor information. As indicated by the dashed lines extending between the various sensors 150 (e.g., the fan speed sensors 152, the temperature sensors 154, and the pressure sensors 156) and the aircraft systems 144 and the engine controller 136 in the embodiment depicted in FIG. 1, the various sensors 150 may be communicatively coupled to the aircraft systems 144 and/or the engine controller 136 in some embodiments. As such, the various sensors 150 may be communicatively coupled via wires or wirelessly to the aircraft systems 144 and/or the engine controller 136 to transmit signals and/or data to the aircraft systems 144 and/or the engine controller 136.

It should be understood that the aircraft 130 merely represents one illustrative embodiment that may be configured to implement embodiments or portions of embodiments of the devices, systems, and methods described herein. During operation, the aircraft 130 (such as the engine controller 136 and/or another component) may diagnose or predict a system fault in one or more of the various aircraft systems 144. By way of non-limiting example, while the aircraft 130 is being operated, the control mechanism 160 may be utilized to operate one or more of the aircraft systems 144. Various sensors 150, including, but not limited to, the fan speed sensors 152, the temperature sensors 154, and/or the pressure sensors 156 may output data relevant to various characteristics of the engine 140 and/or the other aircraft systems 144. The engine controller 136 may utilize inputs from the control mechanism 160, the fan speed sensors 152, the temperature sensors 154, the pressure sensors 156, the various aircraft systems 144, one or more database, and/or information from airline control, flight operations, or the like to diagnose, detect, and/or predict faults that airline maintenance crew may be unaware of. Among other things, the engine controller 136 may analyze the data output by the various sensors 150 (e.g., the fan speed sensors 152, the temperature sensors 154, the pressure sensors 156, etc.), over a period of time to determine drifts, trends, steps, or spikes in the operation of the engines 140 and/or the various other aircraft systems 144. The engine controller 136 may also analyze the system data to determine historic pressures, historic temperatures, pressure differences between the plurality of engines 140 on the aircraft 130, temperature differences between the plurality of engines 140 on the aircraft 130, and/or the like, and to diagnose, detect, and/or predict faults in the engines 140 and/or the various other aircraft systems 144 based thereon. Once a fault has been diagnosed, detected, and/or predicted, an indication may be provided on the aircraft 130 and/or at the ground system 120. It is contemplated that the diagnosis, detection, and/or prediction of faults may be completed during pre-flight checks, may be completed during flight, may be completed post flight, or may be completed after a plurality of flights has occurred. The aircraft wireless communications link 166 and the ground wireless communications link 122 may transmit data such that data and/or information pertaining to the fault may be transmitted off the aircraft 130.

It should be appreciated that, although a particular aerial vehicle has been illustrated and described in FIG. 1, other configurations and/or aerial vehicles, such as high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure.

While the embodiment of FIG. 1 specifically relates to components within an aircraft 130, the present disclosure is not limited to such. That is, the various components depicted with respect to the aircraft 130 may be incorporated within various other types of craft and may function in a similar manner to deliver and install new software and/or updated software to the engine controller 136 as described herein. For example, the various components described herein with respect to the aircraft 130 may be present in watercraft, spacecraft, and/or the like without departing from the scope of the present disclosure.

Still referring to FIG. 1, the ground system 120 is generally a transmission system located on the ground that is capable of transmitting and/or receiving signals to/from the aircraft 130. That is, the ground system 120 may include a ground wireless communications link 122 that is communicatively coupled to the aircraft wireless communications link 166 wirelessly to transmit and/or receive signals and/or data. In some embodiments, the ground system 120 may be an air traffic control (ATC) tower and/or one or more components or systems thereof. Accordingly, the ground wireless communications link 122 may be a VHF communication system, an ACARS unit, a CPDLC system, FANS, and/or the like. Using the ground system 120 and the ground wireless communications link 122, the various non-aircraft components depicted in the embodiment of FIG. 1 may be communicatively coupled to the aircraft 130, even in instances where the aircraft 130 is airborne and in flight. However, it should be understood that the embodiment depicted in FIG. 1 is merely illustrative. In other embodiments, the aircraft 130 may be communicatively coupled to the various other components of the distributed control system 100 when on the ground.

Turning to FIG. 2, a schematic diagram of various components of the distributed control system 100 are depicted. Particularly, FIG. 2 depicts a schematic diagram of the engine controller 136. As explained above, in some embodiments, the engine controller 136 comprises FADEC system. As also explained above, the engine controller 136 comprises an electronic engine control (EEC) 200 and a distributed control module (DCM) 202. The EEC 200 is coupled to the DCM 202 through a data bus 204. In some embodiments, the data bus 204 comprises an Engine Area Distributed Interconnect Network (EADIN). Under the EADIN data bus protocol, the EEC 200 and the DCM 202 operate in a master/slave structure, where the EEC 200 is the master and the DCM 202 is the slave. Thus, the EEC 200 controls the operation of various components of the aircraft 130 through the DCM 202. In some examples, the engine controller 136 may be replaced with a component in an avionics system, a power distribution system, a propeller control system, or another device in the distributed control system 100.

The DCM 202 is coupled to a plurality of sensor nodes 206a, 206b, 206c and a plurality of actuator nodes 208a, 208b, 208c. In the illustration of FIG. 2, three sensor nodes and three actuator nodes are shown for purposes of illustration. However, it should be understood that the distributed control system 100 may comprise any number of sensor nodes and/or actuator nodes. The sensor nodes 206a, 206b, 206c send and receive data from a variety of sensors, such as the sensors 150 of FIG. 1. The actuator nodes 208a, 208b, 208c can control actuation devices such as the aircraft systems 144 of FIG. 1. In some embodiments, the nodes are all located on the aircraft 130. In other embodiments, some of the nodes may be located off the aircraft 130. In some embodiments, the engine controller 136 may include multiple distributed control modules 202 coupled to the EEC 200 through the data bus 204. In these embodiments, each DCM 202 may be coupled to a plurality of different nodes.

Military and/or civilian customers may require authentication and encryption along the data bus 204 to prevent tampering. Furthermore, it is important that data from sensors on the aircraft and commands sent to actuators on the aircraft be processed quickly in order to maintain control of the engine 140 and support operation of the aircraft 130. Thus, distributed engine control has tight real time constraints.

A Diffie-Hellman key exchange uses modular arithmetic involving public-private key pairs made up of large prime numbers (typically hundreds of bits long) to establish a symmetric session key that can be used to encrypt communications between devices. This method is highly secure if the prime numbers used are large enough. However, establishing a secure communication protocol using a system such as Diffie-Hellman key exchange may require many transmissions and significant traffic between devices and may take several seconds to complete, depending on processor loading. Accordingly, disclosed herein is a method for quickly establishing semi-secure encryption, which may be used for communication between devices while a more secure encryption protocol is established between the devices.

The EEC 200 and the DCM 202 use a public-private key infrastructure to establish a semi-secure session key that can be used to encrypt messages while a more secure communications protocol is established by using, for example, a Diffie-Hellman key exchange. Once the semi-secure session key is established, communications between the EEC 200 and the DCM 202 can be encrypted using the session key. A Diffie-Hellman key exchange or other methods can then be performed in the background while communication is ongoing using the session key.

The EEC 200 and the DCM 202 each have a public-private key pair. That is, the EEC 200 has a server public key and an associated server private key and the DCM 202 has a device public key and an associated device private key. When a message is encrypted with a public key, it can be decrypted with the corresponding private key to reveal the original message. This allows for secure communications. Furthermore, when a message is signed with a private key, it can be read with the corresponding public key to reveal the original message. This may be used to verify the sender of the message. In some embodiments, the EEC 200 and the DCM 202 each have one public-private key pair for encrypting messages and another public-private key pair for signing messages.

In embodiments comprising multiple distributed control modules 202, each such DCM may have its own associated public-private key pair. In these embodiments, the methods described herein may be used to establish secure communications between the EEC 200 and each DCM 202.

The public keys of the EEC 200 and the DCM 202 may be freely transmitted and known publicly. Only the private keys need to remain private. Thus, using the methods disclosed herein, a secure session key may be established between the EEC 200 and the DCM 202 even if the communications between establishing the session key are intercepted.

Figure 3:
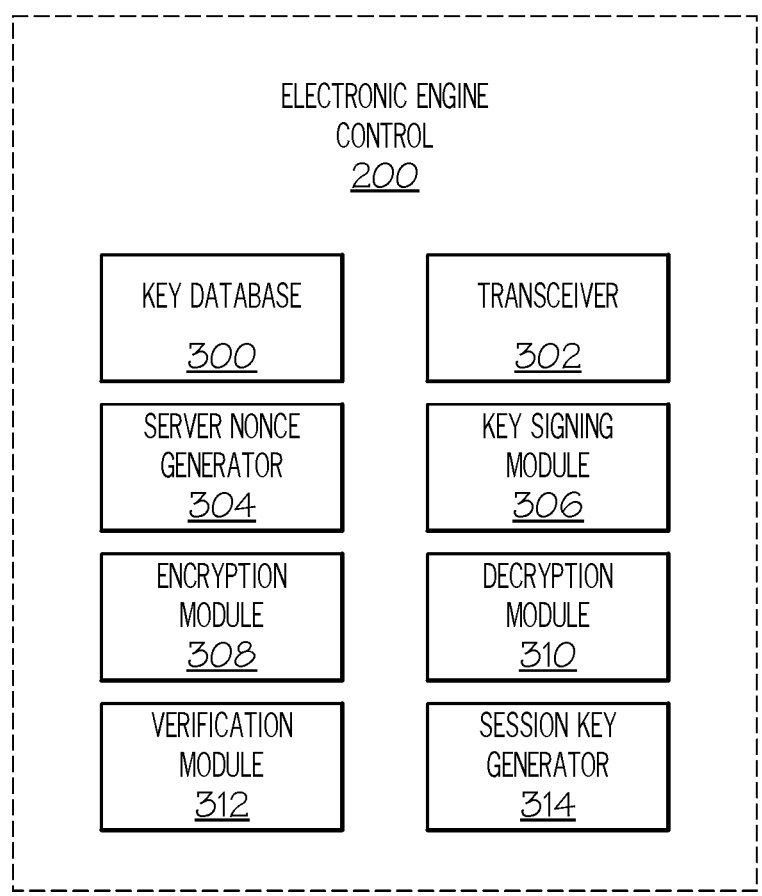
FIG. 3 schematically depicts the electronic engine control of FIGS. 1-2.

Turning to FIG. 3, a schematic diagram of the EEC 200 is shown. The EEC 200 includes a key database 300, a transceiver 302, a server nonce generator 304, a key signing module 306, an encryption module 308, a decryption module 310, a verification module 312, and a session key generator 314.

The key database 300 stores the server public key and the server private key. As discussed above, the server public key can be made publicly available without compromising security but the server private key should remain private and only known to the EEC 200. The key database 300 may also store an authorization public key that is part of an authorization public-private key pair.

The authorization public-private key pair is established outside of the engine controller 136 during key provisioning and is used to authorize or authenticate the public keys of the EEC 200 and the DCM 202. The authorization private key is stored away from the engine controller 136 and is used to sign the server public key to create a server key signature and to sign the device public key to create a device key signature. The authorization public key may be used to read the server key signature to obtain the server public key. This may be used to authenticate the server public key. The authorization public key may also be used to read the device key signature to obtain the device public key and thereby authenticate the device public key. The server key signature may be stored on the key database 300.

Referring to FIGS. 2 and 3, the transceiver 302 sends and receives messages to and from the data bus 204, where the messages can be directed to the DCM 202 or to other components of the aircraft 130. When establishing a secure communication session with the DCM 202, the transceiver 302 sends and receives messages according to the methods disclosed herein. Once a session key is established, the transceiver 302 can send commands to the DCM 202 or receive sensor information from the DCM 202 through the data bus 204.

The server nonce generator 304 generates a server nonce. The server nonce is a one-time use random number that is used in establishing a session key as explained in further detail below. Because the server nonce is randomly generated and is not reused, the server nonce prevents replay attacks from any intermediaries that intercept the server nonce. Typically, a nonce has a minimum of 128 bits. In some embodiments, the server nonce generated by the EEC 200 contains 256 bits.

The key signing module 306 signs messages with the server private key. As explained above, signing a message with a private key creates an encrypted message that can only be decrypted using the associated public key. Because the private key is only known by the sender, a receiver of the message who can successfully decrypt the message using the associated public key can be confident that the message came from the owner of the private key.

In some embodiments, the key signing module 306 first applies a hash function to a message and signs the resulting hash, rather than signing the message itself it. In these embodiments, the signed hash will be transmitted to the DCM 202 along with the original message to be verified. Then, when the DCM 202 receives the message and the signed hash, the signed hash may be read using the server public key and the hash function used by the key signing module 306 may be applied to the received message. The results may then be compared to verify that they match, thereby ensuring that the received message actually came from the EEC 200. This method of signing only a hash of a message rather than the entire message may reduce the amount of data that needs to be signed, thereby increasing computational efficiency.

The encryption module 308 encrypts messages with the device public key or a session key. As explained above, encrypting a message with a public key creates an encrypted message that can only be decrypted using the associated private key. Thus, a message encrypted with a public key can only be decrypted by the holder of the private key, which ensures that the message cannot be decrypted if it is intercepted. Messages encrypted with a symmetric session key can only be decrypted with the session key. Thus, once a secure or semi-secure session key is established, the encryption module 308 may encrypt messages to send securely to the DCM 202.

The decryption module 310 decrypts received messages using the server private key or a session key. In particular, messages received from the DCM 202 that have been encrypted using the server public key are decrypted using the server private key. Because the private key is held by the EEC 200, such messages cannot be decrypted by any other entity if the messages are intercepted. Once a secure or semi-secure session key has been established, the decryption module 310 may decrypt messages received from the DCM 202 that have been encrypted with the session key.

The verification module 312 verifies the sender of a message. Specifically, the verification module 312 verifies that messages signed by the DCM 202 actually came from the DCM 202. The verification module 312 accomplishes this by using the device public key to decrypt and read messages signed with the device private key. If such messages can be successfully decrypted, then the verification module 312 verifies that the message actually came from the DCM 202. Further, the verification module 312 verifies the integrity of device public key by reading the server key signature with the authorization public key.

In embodiments where the key signing module 306 signs hashes as discussed above, the verification module 312 may use the device public key to read a signed hash and then apply the hash function to the result to verify the DCM 202 as a sender of a message.

The session key generator 314 generates a session key to be used by the EEC 200 and the DCM 202 to encrypt communications between them while a more secure communications protocol is established. In some embodiments, the session key generator 314 randomly generates a session key that is only used to encrypt messages for one communications session. Once the session key generator 314 generates a session key, it must be securely transmitted to the DCM 202. The methods herein disclose how this is accomplished.

Figure 4:
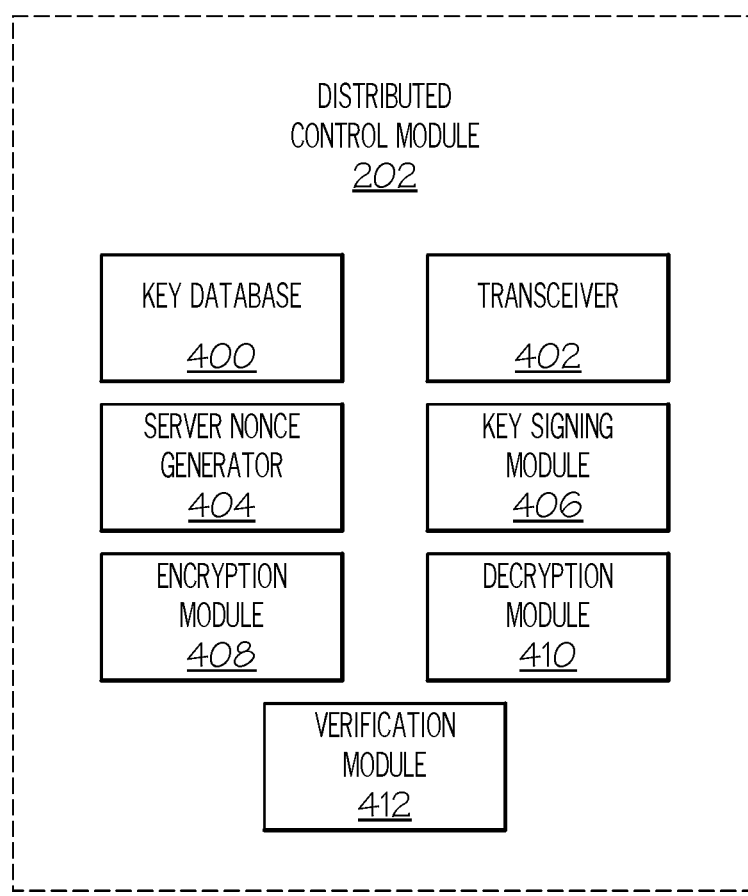
FIG. 4 schematically depicts the distributed control module of FIGS. 1-2.

Turning to FIG. 4, a schematic diagram of the DCM 202 is shown. The DCM 202 includes a key database 400, a transceiver 402, a device nonce generator 404, a key signing module 414, an encryption module 408, a decryption module 410, and a verification module 412.

The key database 400 stores the device public key and the device private key. As explained above, the device public key can be publicly disclosed while the device private key should remain private. The key database 400 may also store the authorization public key and the device key signature.

Referring to FIGS. 2 and 4, the transceiver 402 is sends and receives communications to and from the data bus 204 and to and from the nodes 206a, 206b, 206c, 208a, 208b, 208c, and other nodes that are part of the distributed control system 100. The transceiver 402 is used to send and receive communications to and from the EEC 200 as disclosed in the methods below.

The device nonce generator 404 generates a device nonce. The device nonce may be a randomly generated number, similar to the server nonce generated by the server nonce generator 304 (FIG. 3).

Still referring to FIGS. 2 and 4, the key signing module 406 signs messages with the device private key. The key signing module 406 of the DCM 202 has a similar function to the key signing module 306 of the EEC 200. In some embodiments, the key signing module 406 applies a hash function to a message and signs the resulting hash rather than signing the message in a similar manner as discussed above in connection with the key signing module 306.

The encryption module 408 encrypts messages with the server public key or the session key. The encryption module 408 of the DCM 202 has a similar function to the encryption module 308 of the EEC 200.

The decryption module 410 decrypts received messages using the device private key or the session key. The decryption module 410 of the DCM 202 has a similar function to the decryption module 310 of the EEC 200 (FIG. 3).

Still referring to FIGS. 2 and 4, the verification module 412 verifies the sender of a message and verifies the integrity of the server public key. The verification module 412 of the DCM 202 has a similar function to the verification module 312 of the EEC 200 (FIG. 3). Specifically, the verification module 412 verifies that messages signed by the EEC 200 actually came from the EEC 200 by using the server public key to read messages signed with the server private key. The verification module 412 also authenticates the server public key by reading the server key signature with the authorization public key.

Figure 5:
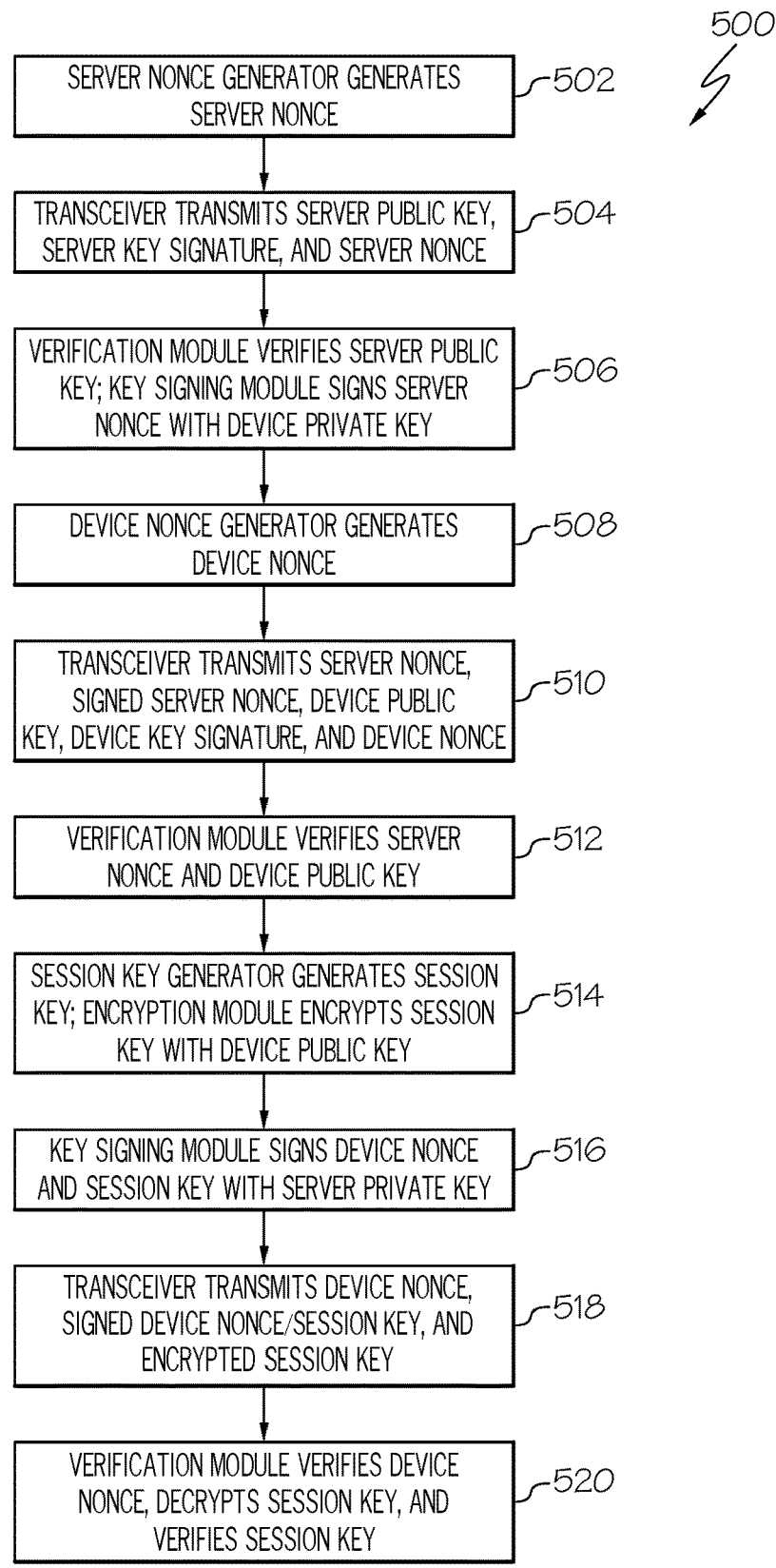
FIG. 5 depicts a flow diagram of an illustrative method of establishing secure communications between embedded devices of the distributed control system of FIG. 1.

FIG. 5 depicts a flow diagram of an illustrative method 500 of authenticating and establishing a secure communications protocol between devices such as between the EEC 200 and the DCM 202 of FIG. 2. The method of FIG. 5 allows for semi-secure encrypted communications between the EEC 200 and the DCM 202 while fully secure communication is established. The method 500 of FIG. 5 uses public-key cryptography to encrypt communications between the EEC 200 and the DCM and to validate the integrity of those communications, as described herein.

Referring to FIGS. 2-5, at block 502, a session request (i.e., a request to establish secure communication between the EEC 200 and the DCM 202) is initiated by the server nonce generator 304 of the EEC 200 generating a server nonce.

In block 504, the transceiver 302 transmits the server public key, the server key signature, and the generated server nonce to the DCM 202. Part of the public key may include a signature from a root signing key that was used to generate the various public and private keys described herein. The root signing key may be part of a public key infrastructure (PKI).

In block 506, the transceiver 402 of the DCM 202 receives the communication from the EEC 200 and the verification module 412 uses the authorization public key to read the received server key signature and verify that the result matches the received server public key. This ensures the integrity of the communication from the EEC 200 and the received server public key. The key signing module 406 then signs the received server nonce with the device private key. Then, in block 508, the device nonce generator 404 generates a device nonce. Similar to the server nonce described above, the device nonce may be a single use, randomly generated number to prevent replay attacks. The use of both a server nonce and a device nonce allows for mutual authentication, whereby each end of the communication authenticates each other.

In block 510, the transceiver 402 transmits back to the EEC 200, the server nonce signature, the original server nonce, the device public key, the device key signature, and the generated device nonce.

In block 512, the transceiver 302 of the EEC 200 receives the communication from the DCM 202 and the verification module 312 verifies that the received server nonce matches the generated server nonce. The verification module 312 then uses the received device public key to read the received server nonce signature and verify that the result matches the original server nonce. The verification module 312 also uses the authorization public key to read the received device key signature and verify that the result matches the received device public key. This ensures the integrity of the communication from the DCM 202 and the integrity of the received device public key.

In block 514, the session key generator 314 generates a symmetric session key to be used for semi-secure communications between the EEC 200 and the DCM 202 while a more secure encryption protocol is established. The encryption module 308 then encrypts the generated session key with the received device public key. Then, in block 516, the key signing module 306 signs a combination of the received device nonce and the generated session key (e.g., a concatenation of the device nonce and the session key) with the server private key. This prevents the session key from being replaced if the communication between the EEC 200 and the DCM 202 is intercepted. In block 518, the transceiver 302 transmits the device nonce, the signed combination of the device nonce and the session key, and the encrypted session key to the DCM 202.

In block 520, the transceiver 402 of the DCM 202 receives the communication from the EEC 200 and the verification module 412 and uses the server public key to read the signed combination of the device nonce and the session key to obtain a validated device nonce and a validated session key. The verification module 412 verifies that the validated device nonce matches the received device nonce. The verification module 412 uses the device private key to decrypt the encrypted session key and verifies that the result matches the validated session key.

At this point, the EEC 200 and the DCM 202 have mutually authenticated each other and have established a secure session key that can be used for semi-secure communications. The EEC 200 and the DCM 202 may begin securely communicating with each other using the symmetric session key. The encryption modules 308 and 408 can encrypt messages using the session key and the decryption modules 310 and 410 can decrypt received encrypted messages. In some embodiments, the method of FIG. 5 takes about 30 milliseconds (ms) to perform. Thus, there is little delay between the initiation of a session request between the EEC 200 and the DCM 202 and the start of semi-secure communications.

While this semi-secure communication is happening, the EEC 200 and the DCM 202 may establish a fully secure symmetric key for more secure communications in the background. In some embodiments, the EEC 200 and the device may establish a forward-secrecy key exchange, such as a Diffie-Hellman key exchange. In some embodiments, it takes around 1-2 seconds to establish a forward-secrecy key using a Diffie-Hellman key exchange. Thus, while the forward-secrecy key is being established, the method 500 of FIG. 5 may be used to quickly establish a semi-secure session key, which can be used to encrypt communications while the Diffie-Hellman key exchange is performed. Once a forward-secrecy session key has been agreed upon through the Diffie-Hellman key exchange, the EEC 200 and the DCM 202 may abandon the session key established using the method 500 of FIG. 5 and may switch to using the more secure forward-secrecy session key to encrypt communications.

It should now be understood that that the devices, systems, and methods described herein utilize devices, systems, and methods for establishing a secure communications protocol between embedded devices in a distributed control system. The devices, systems, and methods described herein establish semi-secure communications in a timely manner while fully secure communications are established.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A method of establishing secure communication between a server and a device in a distributed control system, wherein a first public-private key pair comprising a server public key and a server private key is associated with the server, and wherein a second public-private key pair comprising a device public key and a device private key is associated with the device, the method comprising: with the server, generating a server nonce; transmitting the server public key, a server key signature, and the server nonce from the server to the device; with the device, verifying the server public key, signing the server nonce with the device private key, resulting in a server nonce signature, and generating a device nonce; transmitting the server nonce, the server nonce signature, the device public key, a device key signature, and the device nonce from the device to the server; with the server, verifying the server nonce, verifying the device public key, generating a session key, encrypting the session key with the device public key, resulting in an encrypted session key, and signing a combination of the device nonce and the session key with the server private key, resulting in a combined signature; transmitting the device nonce, the combined signature, and the encrypted session key from the server to the device; with the device, verifying the device nonce, decrypting the encrypted session key with the device private key, resulting in a decrypted session key, and verifying the decrypted session key.

The method of any preceding clause, wherein the server key signature comprises the server public key signed with an authorization private key; and wherein the device key signature comprises the device public key signed with the authorization private key.

The method of any preceding clause, wherein verifying the server public key comprises reading the server key signature with an authorization public key and verifying that the result matches the server public key.

The method of any preceding clause, wherein verifying the server nonce comprises reading the server nonce signature with the device public key and verifying that the result matches the server nonce.

The method of any preceding clause, wherein verifying the device public key comprises reading the device key signature with an authorization public key and verifying that the result matches the device public key.

The method of any preceding clause, wherein verifying the device nonce comprises reading the combined signature with the server public key and verifying that a portion of the result matches the device nonce.

The method of any preceding clause, wherein verifying the decrypted session key comprises reading the combined signature with the server public key and verifying that a portion of the result matches the decrypted session key.

The method of any preceding clause, further comprising transmitting encrypted communications between the server and the device using the session key.

The method of any preceding clause, further comprising establishing a forward-secrecy key between the server and the device.

The method of any preceding clause, wherein the forward-secrecy key is established using a Diffie-Hellman key exchange protocol.

The method of any preceding clause, further comprising, after the forward-secrecy key is established, ceasing transmission of encrypted communications between the server and the device using the session key; and transmitting encrypted communications between the server and the device using the forward-secrecy key.

A distributed control system comprising: an electronic control unit; and one or more distributed control modules; wherein a server public-private key pair comprising a server public key and a server private key is associated with the electronic control unit; one or more public-private key pairs, each comprising a device public key and a device private key, are associated with the one or more distributed control modules; an authorization public-private key pair comprising an authorization public key and an authorization private key is associated with the distributed control system; a server key signature comprises the server public key signed with the authorization private key; a device key signature comprises the device public key signed with the authorization private key; the electronic control unit and at least one distributed control module perform a first method to establish a first session key for engaging in semi-secure encrypted communications with each other; and the electronic control unit and the at least one distributed control module further perform a second method to establish a second session key for engaging in secure encrypted communications with each other.

The distributed control system of any preceding clause, wherein the electronic control unit is configured to establish the first session key by: generating a server nonce; transmitting to the at least one distributed control module, the server public key, a server key signature, and the server nonce; receiving from the at least one distributed control module, the server nonce, a server nonce signature, the device public key, a device key signature, and a device nonce; verifying the server nonce; verifying the device public key; generating the first session key; encrypting the first session key with the device public key, resulting in an encrypted first session key; signing a combination of the device nonce and the first session key with the server private key, resulting in a signed combined signature; and transmitting to the at least one distributed control module, the device nonce, the combined signature, and the encrypted first session key.

The distributed control system of any preceding clause, wherein the electronic control unit verifies the server nonce by reading the server nonce signature with the device public key and verifying that the result matches the server nonce.

The distributed control system of any preceding clause, wherein the electronic control unit verifies the device public key by reading the device key signature with the authorization public key and verifying that the result matches the device public key.

The distributed control system of any preceding clause, wherein the at least one distributed control module is configured to establish the first session key by: receiving from the electronic control unit, the server public key, a server key signature, and a server nonce; verifying the server public key; signing the server nonce with the device private key, resulting in a server nonce signature; generating a device nonce; transmitting to the electronic control unit, the server nonce, the server nonce signature, the device public key, a device key signature, and the device nonce; receiving from the electronic control unit, the device nonce, a combined signature of the device nonce and the first session key, and an encrypted first session key; verifying the device nonce; decrypting the encrypted first session key with the device private key, resulting in a decrypted first session key; and verifying the first session key.

The distributed control system of any preceding clause, wherein the at least one distributed control module verifies the server public key by reading the server key signature with the authorization public key and verifying that the result matches the server public key.

The distributed control system of any preceding clause, wherein the at least one distributed control module verifies the device nonce by reading the combined signature with the server public key and verifying that the result matches the device nonce.

An electronic engine control comprising: a key database storing a public-private key pair comprising a server public key and a corresponding server private key; a transceiver sending messages to one or more devices and receiving messages from the one or more devices; a server nonce generator generating a server nonce; a key signing module signing messages with the server private key; an encryption module encrypting messages with a device public key and encrypting messages with a session key; a decryption module using the server private key to decrypt messages encrypted using the server public key and using the session key to decrypt messages encrypted with the session key; a verification module using a received public key to decrypt messages signed with a private key corresponding to the received public key; and a session key generator generating the session key.

The electronic engine control of any preceding clause, wherein the key signing module creates a server key signature by signing the server public key with the server private key.

What is claimed is:

1. A method of establishing secure communication between a server and a device in a distributed control system, wherein a first public-private key pair comprising a server public key and a server private key is associated with the server, and wherein a second public-private key pair comprising a device public key and a device private key is associated with the device, the method comprising:
   with the server, generating a server nonce;
   transmitting the server public key, a server key signature comprising the server public key signed with an authorization private key, and the server nonce from the server to the device;
   with the device, verifying the server public key by reading the server key signature with an authorization public key and verifying that the reading matches the server public key, signing the server nonce with the device private key, resulting in a server nonce signature, and generating a device nonce;
   after verifying the server public key, transmitting the server nonce, the server nonce signature, the device public key, a device key signature comprising the device public key signed with the authorization private key, and the device nonce from the device to the server;
   with the server, verifying the server nonce, verifying the device public key, generating a session key, encrypting the session key with the device public key, resulting in an encrypted session key, and signing a combination of the device nonce and the session key with the server private key, resulting in a combined signature;
   transmitting the device nonce, the combined signature, and the encrypted session key from the server to the device; and
   with the device, verifying the device nonce, decrypting the encrypted session key with the device private key, resulting in a decrypted session key, and verifying the decrypted session key.

2. The method of claim 1, wherein verifying the server nonce comprises reading the server nonce signature with the device public key and verifying that the reading matches the server nonce.

3. The method of claim 1, wherein verifying the device public key comprises reading the device key signature with the authorization public key and verifying that the reading matches the device public key.

4. The method of claim 1, wherein verifying the device nonce comprises reading the combined signature with the server public key and verifying that a portion of the reading matches the device nonce.

5. The method of claim 1, wherein verifying the decrypted session key comprises reading the combined signature with the server public key and verifying that a portion of the reading matches the decrypted session key.

6. The method of claim 1, further comprising transmitting encrypted communications between the server and the device using the session key.

7. The method of claim 1, further comprising establishing a forward-secrecy key between the server and the device.

8. The method of claim 7, wherein the forward-secrecy key is established using a Diffie-Hellman key exchange protocol.

9. The method of claim 7, further comprising, after the forward-secrecy key is established:
   ceasing transmission of encrypted communications between the server and the device using the session key; and
   transmitting encrypted communications between the server and the device using the forward-secrecy key.

* * * * *